(12) United States Patent
Cintas et al.

(10) Patent No.: US 12,536,838 B2
(45) Date of Patent: Jan. 27, 2026

(54) PATCH-BASED ADVERSARIAL ATTACK DETECTION AND MITIGATION

(71) Applicant: International Business Machines Corporation, Armonk, NY (US)

(72) Inventors: Celia Cintas, Nairobi (KE); Hannah Halin Kim, New York, NY (US); Girmaw Abebe Tadesse, Nairobi (KE); Skyler Speakman, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 18/129,417

(22) Filed: Mar. 31, 2023

(65) Prior Publication Data

US 2024/0331449 A1    Oct. 3, 2024

(51) Int. Cl.
*G06V 40/40* (2022.01)
*G06V 10/774* (2022.01)
*G06V 40/20* (2022.01)

(52) U.S. Cl.
CPC ............ *G06V 40/40* (2022.01); *G06V 10/774* (2022.01); *G06V 40/20* (2022.01)

(58) Field of Classification Search
CPC ...... G06V 40/40; G06V 10/774; G06V 40/20; G06V 10/82
See application file for complete search history.

(56) References Cited

U.S. PATENT DOCUMENTS

| | | | |
|---|---|---|---|
| 8,495,429 B2 | 7/2013 | Fu et al. | |
| 9,361,463 B2 | 6/2016 | Ferragut et al. | |
| 10,783,401 B1 | 9/2020 | Jiang et al. | |
| 10,805,316 B2 | 10/2020 | Aditham et al. | |
| 2012/0041575 A1 | 2/2012 | Maeda et al. | |
| 2021/0097176 A1* | 4/2021 | Mathews | G06N 5/01 |
| 2021/0125005 A1 | 4/2021 | Kuta et al. | |
| 2021/0157912 A1* | 5/2021 | Kruthiveti Subrahmanyeswara Sai | G06F 21/554 |
| 2022/0277173 A1* | 9/2022 | He | G06N 3/0475 |
| 2022/0277187 A1* | 9/2022 | Wang | G06N 3/0455 |
| 2022/0405648 A1* | 12/2022 | Lin | G06N 3/094 |

(Continued)

FOREIGN PATENT DOCUMENTS

| | | |
|---|---|---|
| CN | 109951500 B | 6/2019 |
| CN | 110691100 B | 1/2020 |

(Continued)

OTHER PUBLICATIONS

Xu et al., PatchZero: Defending against Adversarial Patch Attacks by Detecting and Zeroing the Patch p. 1-10, Sep. 5, 2022 (Year: 2022).*

(Continued)

*Primary Examiner* — Ming Y Hon
(74) *Attorney, Agent, or Firm* — Harrity & Harrity, LLP

(57) ABSTRACT

A present invention embodiment prevents patch-based adversarial attacks. A plurality of time-series images are processed using a machine learning model to identify an anomaly, wherein the anomaly comprises an adversarial patch-based attack, and wherein the anomaly is present in a locality comprising a particular time and space in the plurality of time-series images. A subset of the plurality of time-series images are modified based on the locality of the anomaly to mask the anomaly from detection by a trained image processing model.

20 Claims, 5 Drawing Sheets

(56) References Cited

U.S. PATENT DOCUMENTS

| | | | | |
|---|---|---|---|---|
| 2023/0061517 | A1* | 3/2023 | Yang | G06V 10/774 |
| 2023/0325678 | A1* | 10/2023 | Fradkin | G06N 20/20 |
| | | | | 706/25 |
| 2023/0410469 | A1* | 12/2023 | Muehlenstaedt | G06V 20/58 |
| 2024/0182071 | A1* | 6/2024 | Jafari Tafti | B60W 60/00188 |
| 2024/0296225 | A1* | 9/2024 | Afrasiabi | G06V 10/82 |
| 2025/0068960 | A1* | 2/2025 | Yu | G06N 3/08 |

FOREIGN PATENT DOCUMENTS

| | | |
|---|---|---|
| CN | 112738015 A | 4/2021 |
| IN | 104506482 B | 4/2015 |
| WO | 2017087591 A1 | 5/2017 |

OTHER PUBLICATIONS

W. R. Almeida, et al., "Detecting face presentation attacks in mobile devices with a patch-based CNN and a sensoraware loss function", Research Article, PLoS ONE 15(9): e0238058, https://doi.org/10.1371/journal.pone.0238058, 2020, 24 pages.

S. Schrodi, et al., "What Causes Optical Flow Networks to be Vulnerable to Physical Adversarial Attacks", https://www.researchgate.net/publication/350512124_What_Causes_Optical_Flow_Networks_to_be_Vulnerable_to_Physical_Adversarial_Attacks, arXiv"2103.16255v1 [cs.CV], Mar. 30, 2021, 17 pages.

A. Ranjan, et al., "Attacking Optical Flow", https://arxiv.org/abs/1910.10053, Oct. 22, 2019, 21 pages.

B. Vinzamuri, et al., "An End-to-End Context Aware Anomaly Detection System", 2020 IEEE International Conference on Big Data (Big Data), Dec. 2020, 10 pages.

S. Maleki, et al., "Unsupervised anomaly detection with LSTM autoencoders using statistical data-filtering", https://www.sciencedirect.com/science/article/abs/pii/S1568494621003665, Applied Soft Computing 108 (2021): 107443, 10 pages.

M. Du, et al., "DeepLog: Anomaly Detection and Diagnosis from System Logs through Deep Learning", https://dl.acm.org/, In Proceedings of the 2017 ACM SIGSAC conference on computer and communications security (pp. 1285-1298), Oct. 2017, 14 pages.

S. Schrodi, et al., "Towards Understanding Adversarial Robustness of Optical Flow Networks", https://www.semanticscholar.org/paper/Towards-Understanding-Adversarial-Robustness-of-Schrodi-Saikia/423a32ae52806af0a4c730e34399363a61c10c35, In Proceedings of the IEEE/CVF Conference on Computer Vision and Pattern Recognition (pp. 8916-8924), 2022, 21 pages.

* cited by examiner

PATCH-BASED ADVERSARIAL ATTACK DETECTION AND MITIGATION

BACKGROUND

1. Technical Field

Present invention embodiments relate to image processing and machine learning, and more specifically, to detecting and mitigating patch-based adversarial attacks.

2. Discussion of the Related Art

A patch-based adversarial attack is a type of computer vision attack that involves the use of a small patch or image overlay that deceives a machine learning algorithm into misclassifying an object or scene. The patch is usually added to an image in a targeted manner to exploit the specific vulnerabilities of a machine learning model. In this type of attack, an attacker can create a small patch that, when added to an image, can cause a machine learning model to classify the image incorrectly. While a patch can be inserted by editing an image, a patch-based attack may also be conducted using an object that is physically present when the image data is acquired. For example, an individual may wear a mask or clothing that is designed to fool a machine learning algorithm. A patch can be designed to blend seamlessly with the image and may be imperceptible to the human eye, making the patch difficult to detect.

Thus, patch-based adversarial attacks can be used to compromise the security and reliability of machine learning models across a variety of applications. While researchers are working on developing defenses against adversarial patch-based attacks, the development of effective defenses against adversarial attacks is an ongoing area of research.

SUMMARY

According to one embodiment of the present invention, a system is provided for preventing patch-based adversarial attacks. A plurality of time-series images are processed using a machine learning model to identify an anomaly, wherein the anomaly comprises an adversarial patch-based attack, and wherein the anomaly is present in a locality comprising a particular time and space in the plurality of time-series images. A subset of the plurality of time-series images are modified based on the locality of the anomaly to mask the anomaly from detection by a trained image processing model. Embodiments of the present invention further include a method and computer program product for preventing patch-based adversarial attacks in substantially the same manner described above.

BRIEF DESCRIPTION OF THE DRAWINGS

Generally, like reference numerals in the various figures are utilized to designate like components.

DETAILED DESCRIPTION

Figure 1:
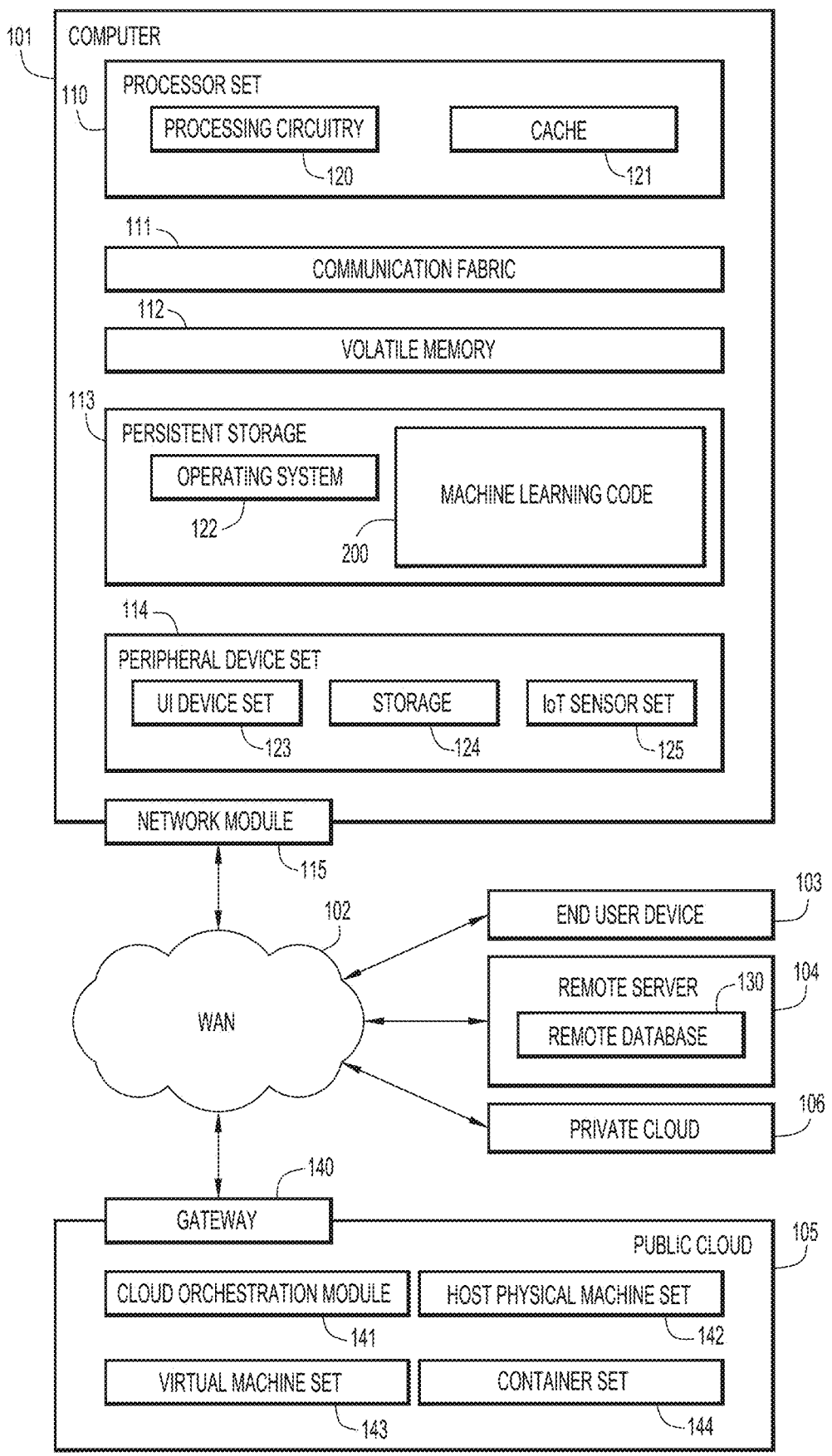
FIG. 1 is a diagrammatic illustration of an example computing environment according to an embodiment of the present invention.

Present invention embodiment relate to image processing and machine learning, and more specifically, to detecting and mitigating patch-based adversarial attacks. There are several different categories of machine learning models that perform image or video analysis, such as object recognition models, generative models, motion analysis models, and the like. Motion analysis in particular is a major component of computer vision and is the basis for various applications such as object tracking, activity recognition, and the like.

While conventional motion analysis models can achieve promising results, these models are not robust enough to resist certain forms of adversarial attacks. These adversarial attacks typically come in the form of patch-based attacks in which an adversarial patch is pasted onto a local region of the input images. There can be various sources for these attacks, such as a hacker who tries to introduce data that disrupts the system, a person wearing a shirt with anomalous patterns, or an object that is applied to a camera lens.

While patch-based adversarial attacks may or may not be visible to humans, machine learning models are unable to distinguish the attacks from legitimate elements that the models are trained to identify, such as motion, objects, etc. Patch-based adversarial attacks on motion estimators can disrupt the decision-making capabilities of applications that rely on motion estimation, which can lead to life-threatening issues in the context of self-driving vehicles and other applications. For example, if the motion estimation capability of an autonomous car is compromised, the vehicle's obstacle avoidance can be manipulated to the detriment of passengers as well as any nearby pedestrians. As another example, many live sporting events have cameras that rely upon motion estimation in order to track and detect the motion of a ball; a patch-based adversarial attack can cause a camera to fail to capture an important shot such as an athlete making a goal.

Thus, present invention embodiments detect patch-based adversarial attacks, enabling attacks to be mitigated to prevent disruption of image processing models. In particular, a machine learning model is employed that is trained to detect a patch-based adversarial attacks, and can then be used to identify the source of the attack in input image data. Thus, an attack can be localized and mitigated by either modifying the image data that is provided to an image processing model, or indicating to the image processing model that the identified feature represents an attack and should be ignored. Present embodiments detect patch-based adversarial attacks in time-series image data, thus providing a higher degree of accuracy over traditional approaches because the attacks can be identified in space as well as time.

Accordingly, present invention embodiments improve the field of machine learning by implementing novel image processing techniques that make image processing models more robust to attacks. In particular, present invention embodiments improve the accuracy of patch-based adversarial attack detection. Moreover, present invention embodiments provide the practical application of improving the safety of any automated systems that rely upon image processing models that may otherwise be susceptible to patch-based adversarial attacks.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as machine learning code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
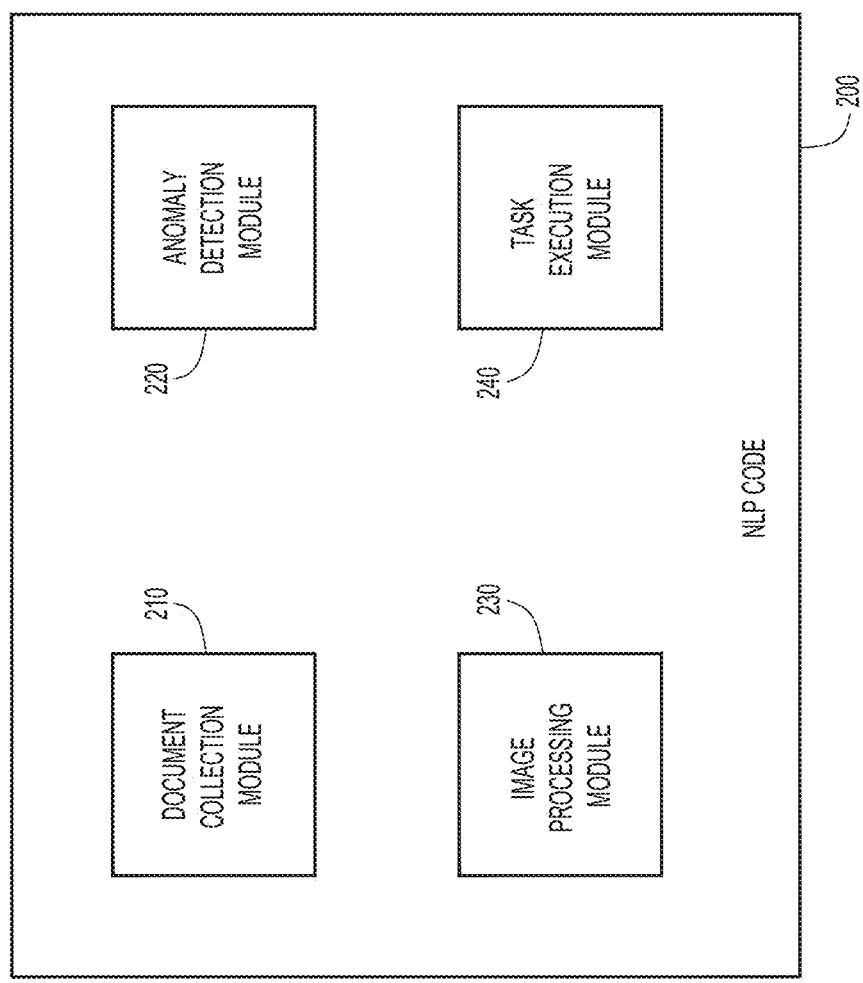
FIG. 2 is a block diagram of machine learning code according to an embodiment of the present invention.

A block diagram of machine learning code 200 according to an embodiment of the present invention is illustrated in FIG. 2. Specifically, machine learning code 200 includes a data collection module 210, an anomaly detection module 220, an image processing module 230, and a task execution module 240.

Data collection module 210 may collect image data for processing in accordance with present invention embodiments. The image data can be acquired by any image capture device (e.g., a camera) and can be stored in any format. The image data may be time-series data, which is type of data that is collected at regular intervals over time. Thus, the image data may be a video recording that comprises a sequence of images that are obtained in chronological order, with each individual image representing an observation made at a specific point in time. In various embodiments, the time-series nature of the image data can be indicated by defining an order of the images (e.g., by applying an ordinal numbering scheme), or metadata may be associated with each image data that includes a timestamp. Data collection module 210 may obtain the image data from one or more image capture devices that can be local to a computing device upon which data collection module 210 resides (e.g., computer 101), or one or more image capture devices may be remotely accessible (e.g., via WAN 102). In some embodiments, data collection module 210 may perform pre-processing operations on the image data, such as converting the image data to another format, performing noise reduction, or other desired operations to prepare the image data for additional processing in accordance with present embodiments.

Anomaly detection module 220 may include a trained machine learning model that detects anomalies in input image data. The anomalies may indicate the presence of patch-based adversarial attacks, and may or may not be detectable by human vision. Anomaly detection module 220 may employ one or more machine learning models that are trained to process time-series image data. In particular, anomaly detection module 220 may process time-series image data to identify both the time and space in which an anomaly is present in the data. In some embodiments, the machine learning model(s) employed by anomaly detection module 220 is/are non-parametric machine learning models, which refers to a type of model that in which assumptions are not made about the underlying probability distribution of the data. Unlike parametric models, which have a fixed number of parameters that define their structure, non-parametric models have an unlimited number of parameters that can be adjusted to fit the data. For example, non-parametric machine learning models may include decision trees, random forests, support vector machines (SVMs), k-nearest neighbors (KNN), and/or neural networks.

Anomaly detection module 220 may include a machine learning model that is trained to detect anomalies using an unsupervised training approach. Initially, samples of time-series image data are obtained from an area (e.g., an indoor or outdoor location) that are free of any adversarial attacks. A set of training data can be obtained by applying a patch-based adversarial attack to some or all of the samples of time-series image data, which can be labeled with respect to whether an adversarial attack is present. Thus, a machine learning model can be trained to identify the presence of anomalies that are associated with adversarial attacks in an unsupervised manner. When an anomaly is detected in an output layer of the machine learning model, the corresponding location of the patch-based adversarial attack can be determined in the input data to identify a particular time and space in which the adversarial attack occurred. Machine learning-based anomaly detection is discussed in further detail below with reference to FIGS. 3 and 5.

Image processing module 230 may include one or more machine learning models that perform image processing tasks on time-series image data. In various embodiments, image processing module 230 may include a motion detection model, an object recognition model, and/or other types of image processing models. The time-series image data processed by image processing module 230 may include data that is first processed to anomaly detection module 220 in order to detect and mitigate any patch-based adversarial attacks so that image processing module 230 is not compromised.

Image processing module 230 may include a machine learning motion detection model that analyzes video footage or image frames and detects changes in motion over time. The model may be trained using supervised learning techniques on a dataset of labeled video or image frames, where each frame is labeled as either containing motion or not containing motion. During the training process, the model may learn to identify features and patterns in the video or image frames that are associated with motion. These features may include changes in pixel intensity, edge detection, and/or optical flow, which are then used to classify each frame as either containing motion or not containing motion. Once the motion detection model is trained, the model can be used to detect motion in new video footage or image frames by analyzing each frame and classifying it as either containing motion or not containing motion. Machine learning motion detection models can be implemented using a variety of techniques, including convolutional neural networks, support vector machines, and/or decision trees.

Additionally or alternatively, image processing module 230 may include a machine learning object recognition model that analyzes image data in order to identify objects within the image data. An object recognition model may be trained using a dataset of labeled images, wherein each image is labeled with regard to one or more objects that are present in the image. During the training process, an object recognition model may learn to identify features within the images that are associated with specific objects, such as particular edges, textures, shapes, or colors, which are then used to classify each object within the image. An object recognition model may also be able to localize the objects within the image by identifying their position and boundaries. Machine learning object recognition models can be implemented using a variety of techniques, such as neural networks (e.g., convolutional neural networks). Once trained, an object recognition models can perform operations to support self-driving vehicles, can perform medical image analysis, and the like.

Task execution module 240 may perform various desired operations based on the output of image processing module 230. In some embodiments, task execution module 240 includes a navigation system for an autonomous vehicle or robot, and relies upon the motion detection and/or object detection of image processing module 230 in order to perform tasks such as obstacle avoidance, route navigation, and the like. In other embodiments, task execution module 240 may include a security system or object tracking system that utilizes object recognition to perform tasks. For example, task execution module 240 may control a camera that tracks an object or person in a sporting event, or task execution module 240 may issue security notifications based on the presence of certain objects in an environment.

Figure 3:
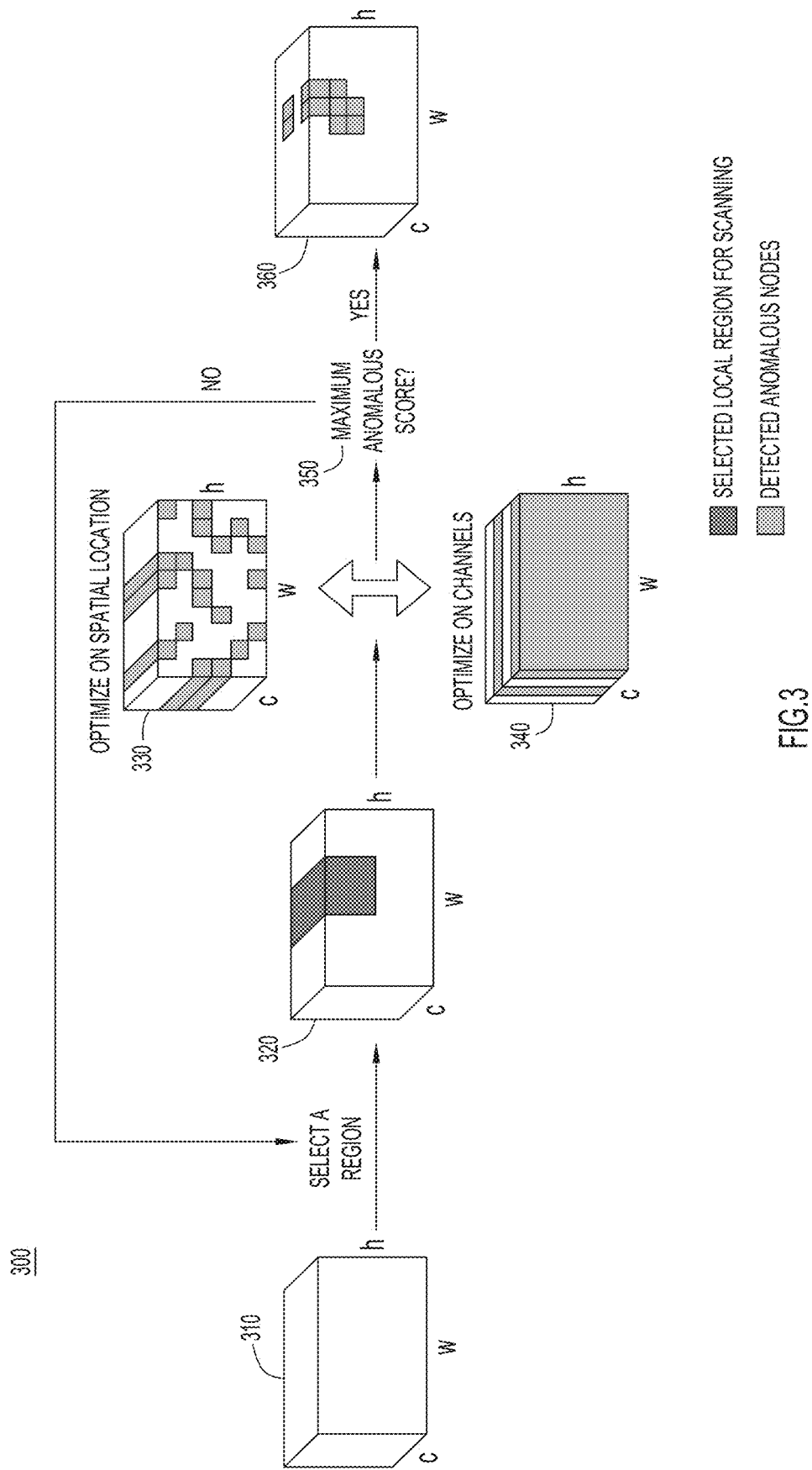
FIG. 3 is a block diagram of a process for detecting anomalies according to an embodiment of the present invention.

FIG. 3 is a block diagram of a process 300 for detecting anomalies according to an embodiment of the present invention. As depicted, a trained machine learning model detects anomalies by processing input data 310, which includes time-series image data in which each image has dimensions of "w" and "h," with "c" indicating a particular channel.

A region of input data 310 is selected at operation 320. The region may correspond to a particular sub-selection of input data 310 that can span both time and space dimensions. The region is scanned by optimizing on spatial and temporal locations at operation 330, which can be separated by channels (e.g., two-dimensional matrices that correspond to different layer spaces (e.g., red/green/blue, etc.) for each particular spatial location being analyzed) at operation 340 to determine whether the region corresponds to a maximum anomalous score at operation 350. The number of channels can be as high as a hundred or more, however, and the red/green/blue example should not be construed as limiting to three channels. Operations 330 and 340 together perform spatial-channel optimization, wherein a subset of spatial locations are returned that are crossed with a subset of channels. Operations 320 through 350 are performed until input data 310 is comprehensively analyzed to identify a specific region that corresponds to an anomaly at operation 360. These operations may be performed in a particular order such that an alternating sequence of operations is performed until no more changes can be made that increase the score any further (e.g., when the iterative ascent procedure converges to a local maximum).

As one example of a gradient ascent, initially, all channels are included. Next, a subset of spatial locations with higher-than-expected activations at their nodes (across all channels) is detected. Given the subset of spatial locations, a subset of channels is then selected that likewise has higher-than-expected activations. Then, a subset of spatial locations within that subset of channels is selected. Accordingly, the gradient ascent can repeat in an alternating order until convergence is achieved, and an anomaly can accordingly be identified. In some embodiments, random initializations can be applied rather than starting with all channels (also referred to as "random restarts") and an iterative ascent/descent algorithm can thus be applied.

By performing operations 320 through 350, subset scanning on inner layer activations of a machine learning model is performed to compute an anomaly score of each test region based on their computed p-values by comparing the p-values to the activations of one or more clean background samples. The temporal information is also utilized in order to improve detection with various spatial constraints. In some embodiments, spatial-channel optimization is performed in order to maximize a scoring function over subsets of spatial locations that can also be used to maximize over a subset of channels. An iterative ascent procedure is employed that optimizes over spatial locations first, then over channels, and then back to spatial locations. Each step of the ascent is conditioned on the highest-scoring subset found so far, and this ascent is guaranteed to converge to a local maximum such that any change to either the subset of spatial locations or a subset of channels would decrease the score. A detected anomalous location can be traced back to the input samples to localize where an attack occurred, as is depicted and described in further detail with reference to FIG. 4.

Figure 4:
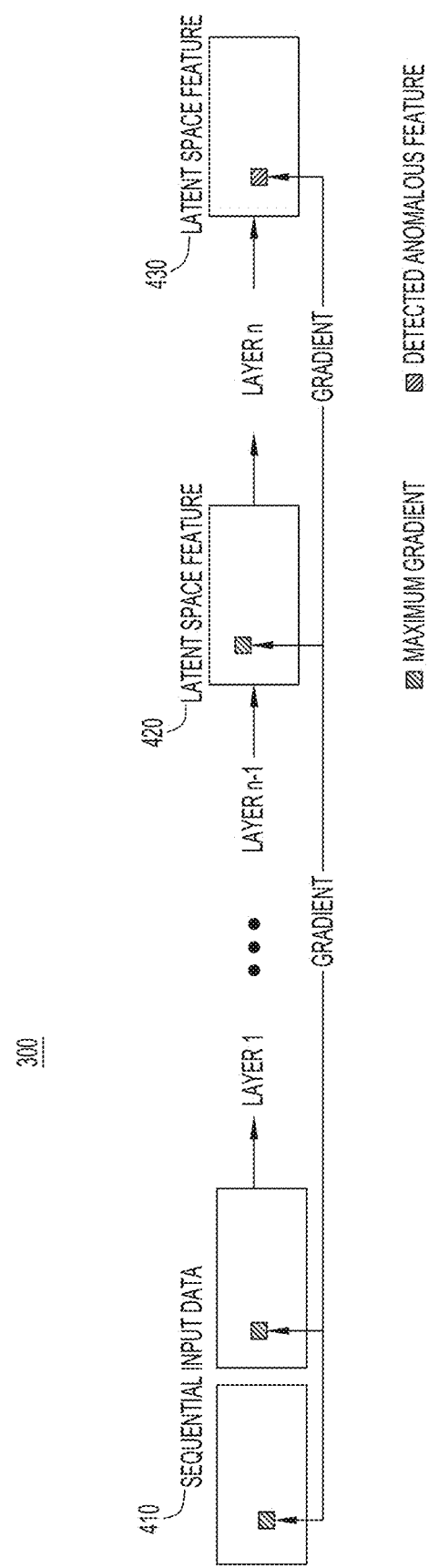
FIG. 4 is a block diagram of a process for detecting anomalies according to an embodiment of the present invention.

FIG. 4 is a block diagram of a process 400 for detecting anomalies according to an embodiment of the present invention. As depicted, sequential (i.e. time-series) input data 410 is provided to a multi-layer machine learning model having n layers, and including latent space features 420 and 430. An anomalous feature is detected in latent space feature 430 in accordance with present embodiments, and a corresponding locality is identified in input data 410 by performing back-propagation through the layers. In particular, the gradient of the detected anomalous feature is computed in each layer with respect to the features in the previous layer. Thus, for example, the gradient indicates how much each feature in layer n−1 influences the detected anomalous feature in layer n. The feature with the maximum gradient magnitude (which is accordingly the feature with the greatest influence) is identified, and its gradient is next computed with respect to the features in its previous layer (e.g., layer n−2). This process is repeated until arriving at the sequential input data, enabling the location in the input data with the highest gradient magnitude to be identified. This location in the input data may accordingly correspond to the locality in which the patch-based adversarial attack occurs.

Figure 5:
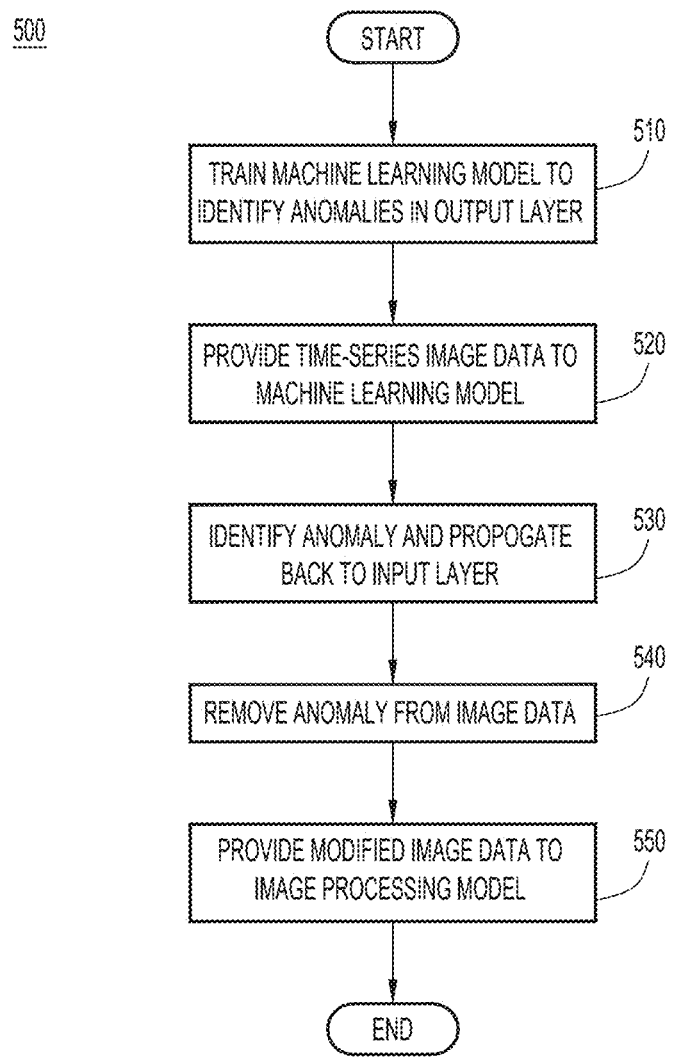
FIG. 5 is a flowchart of a method of training and applying a machine learning model according to an embodiment of the present invention.

FIG. 5 is a flowchart of a method 500 of training and applying a machine learning model according to an embodiment of the present invention.

A machine learning model is trained to identify anomalies in an output layer at operation 510. The machine learning model may be trained by obtaining a set of time-series image data that has not been subject to a patch-based adversarial attack, and then applying a patch-based adversarial attack to a subset of the training data. Once the training data is generated, the machine learning model can be trained in an unsupervised manner; the machine learning model may include a non-parametric model in order to not impose a limit on the feature count. Once trained, the machine learning model can process time-series image data to identify in its output layer an anomaly that corresponds to the presence of a patch-based adversarial attack.

Time-series image data is provided to the trained machine learning model at operation 520. The time-series image data may be acquired by one or more cameras, and may correspond to data that is being provided to an image processing model to support a task (e.g., autonomous navigation, object recognition, etc.). The image data may be pre-processed in order to convert the data to a particular format, remove noise, or perform other desired operations.

An anomaly is identified in the output layer and propagated back to the input layer at operation 530. The machine learning model may initially identify an anomaly in the output layer. Next, the gradient of the anomaly may be computed for the output layer with respect to the immediately-preceding layer to identify a feature associated with the strongest gradient. This feature may then be used to similarly identify a feature in the next-preceding layer iteratively until arriving at the input layer. The feature of the input layer with the maximum gradient may be selected as corresponding to the patch-based adversarial attack.

The anomaly is removed from the image data at operation 540. The image data may be modified to mask the patch-based adversarial attack so that the attack will not interfere with an image processing model. In various embodiments, the image data can be modified by deleting portions of the data corresponding to the attack or editing portions of the data corresponding to the attack (e.g., by applying a transform, a blurring operation, etc.).

The modified image data is provided to an image processing model at operation 550. The modified data can be provided to an image processing model so that the image processing model can perform its intended operations without being impacted by the patch-based adversarial attack (e.g., by detecting an incorrect motion due to the presence of a patch-based adversarial attack). The identification and removal of patch-based adversarial attacks may be performed in real-time to support time-sensitive tasks, such as autonomous vehicular navigation. Thus, present invention embodiments improve the security of image processing tasks by ensuring that patch-based adversarial attacks can be identified and mitigated.

It will be appreciated that the embodiments described above and illustrated in the drawings represent only a few of the many ways of implementing embodiments for identifying and mitigating exploits that are intended to compromise machine learning models.

The environment of the present invention embodiments may include any number of computer or other processing systems (e.g., any computing device, including a local client device, a remote server, or a combination thereof, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., data collection module 210, anomaly detection module 220, image processing module 230, task execution module 240, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, distributed computing, and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the computing system. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., user utterance data, historical user interaction data, modification data, natural language processing model data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The time-series image data, training data, machine learning model data, image processing model data, and/or any other data may include any information arranged in any fashion, and may be configurable based on rules or other criteria to provide desired information to a user.

The present invention embodiments are not limited to the specific tasks or algorithms described above, but may be utilized for any application in which adversarial attacks that are intended to exploit machine learning models are identified and mitigated.

The data may include any format of storing data and may include any data descriptive of different versions of a document. The data may be obtained via any techniques, and may be accessed over a network, fetched from local storage, provided via user input, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of preventing patch-based adversarial attacks comprising:
processing a plurality of time-series images, using a machine learning model having a plurality of layers including latent space, to identify an anomaly, wherein the anomaly comprises an adversarial patch-based attack, wherein the anomaly is present in a locality comprising a particular time and space in the plurality of time-series images, and wherein processing the plurality of time-series images using the machine learning model includes:
detecting the anomaly in the latent space;
computing a gradient of the anomaly for each layer, of the plurality of layers of the machine learning model, with respect to a corresponding preceding layer; and
identifying the locality based on computing the gradient for the anomaly for each layer; and
modifying, in real-time, a subset of the plurality of time-series images based on the locality to mask the anomaly from detection by a trained image processing model.

2. The computer-implemented method of claim 1, wherein the trained image processing model is a motion detection model and wherein masking the anomaly from detection prevents the motion detection model from indicating that the anomaly indicates an incorrect motion.

3. The computer-implemented method of claim 1, wherein the machine learning model comprises a non-parametric machine learning model.

4. The computer-implemented method of claim 1, wherein the machine learning model is trained using unsupervised learning, and wherein the machine learning model is trained with a training corpus of examples of training time-series images, including a subset of training time-series images that include one or more examples of adversarial patch-based attacks.

5. The computer-implemented method of claim 1, wherein the machine learning model detects the anomaly in an output layer and identifies the locality in an input layer by propagating back through one or more layers, of the plurality of layers of the machine learning model, to identify the particular time and space of the locality in the plurality of time-series images.

6. The computer-implemented method of claim 5, wherein the machine learning model applies spatial constraints when propagating back to exclude latent space features from consideration when propagating back when the latent space features are beyond a threshold distance from a latent space feature corresponding to the anomaly.

7. The computer-implemented method of claim 1, wherein the plurality of time-series images, including the modified subset of the plurality of time-series images, is processed by the trained image processing model to perform an autonomous vehicular navigation task.

8. A computer system for preventing patch-based adversarial attacks comprising:
one or more memories; and
at least one processor coupled to the one or more memories, wherein the at least one processor is configured to:
process a plurality of time-series images, using a machine learning model having a plurality of layers including latent space, to identify an anomaly, wherein the anomaly comprises an adversarial patch-based attack, wherein the anomaly is present in a locality comprising a particular time and space in the plurality of time-series images, and wherein processing the plurality of time-series images using the machine learning model includes:
detecting the anomaly in the latent space;
computing a gradient of the anomaly for each layer, of the plurality of layers of the machine learning model, with respect to a corresponding preceding layer; and
identifying the locality based on computing the gradient for the anomaly for each layer; and
modify, in real-time, a subset of the plurality of time-series images based on the locality of the anomaly to mask the anomaly from detection by a trained image processing model.

9. The computer system of claim 8, wherein the trained image processing model is a motion detection model and wherein masking the anomaly from detection prevents the motion detection model from indicating that the anomaly indicates an incorrect motion.

10. The computer system of claim 8,
wherein the machine learning model comprises a non-parametric machine learning model.

11. The computer system of claim 8,
wherein the machine learning model is trained using unsupervised learning, and wherein the machine learning model is trained with a training corpus of examples of training time-series images, including a subset of training time-series images that include one or more examples of adversarial patch-based attacks.

12. The computer system of claim 8,
wherein the machine learning model detects the anomaly in an output layer and identifies the locality in an input layer by propagating back through one or more layers, of the plurality of layers of the machine learning model, to identify the particular time and space of the locality in the plurality of time-series images.

13. The computer system of claim 12,
wherein the machine learning model applies spatial constraints when propagating back to exclude latent space features from consideration when propagating back when the latent space features are beyond a threshold distance from a latent space feature corresponding to the anomaly.

14. The computer system of claim 8,
wherein the plurality of time-series images, including the modified subset of the plurality of time-series images, is processed by the trained image processing model to perform an autonomous vehicular navigation task.

15. A computer program product for preventing patch-based adversarial attacks, the computer program product comprising one or more computer readable storage media having program instructions collectively stored on the one or more computer readable storage media, the program instructions executable by at least one processor to cause the at least one processor to:
process a plurality of time-series images, using a machine learning model having a plurality of layers including latent space, to identify an anomaly, wherein the anomaly comprises an adversarial patch-based attack, wherein the anomaly is present in a locality comprising a particular time and space in the plurality of time-series images, and wherein processing the plurality of time-series images using the machine learning model includes:
detecting the anomaly in the latent space;
computing a gradient of the anomaly for each layer, of the plurality of layers of the machine learning model, with respect to a corresponding preceding layer; and
identifying the locality based on computing the gradient for the anomaly for each layer; and
modify, in real-time, a subset of the plurality of time-series images based on the locality to mask the anomaly from detection by a trained image processing model.

16. The computer program product of claim 15,
wherein the trained image processing model is a motion detection model and wherein masking the anomaly from detection prevents the motion detection model from indicating that the anomaly indicates an incorrect motion.

17. The computer program product of claim 15,
wherein the machine learning model comprises a non-parametric machine learning model.

18. The computer program product of claim 15,
wherein the machine learning model is trained using unsupervised learning, and wherein the machine learning model is trained with a training corpus of examples of training time-series images, including a subset of training time-series images that include one or more examples of adversarial patch-based attacks.

19. The computer program product of claim 15,
wherein the machine learning model detects the anomaly in an output layer and identifies the locality in an input layer by propagating back through one or more layers, of the plurality of layers of the machine learning model, to identify the particular time and space of the locality in the plurality of time-series images.

20. The computer program product of claim 19,
wherein the machine learning model applies spatial constraints when propagating back to exclude latent space features from consideration when propagating back when the latent space features are beyond a threshold distance from a latent space feature corresponding to the anomaly.

* * * * *